Sept. 21, 1954     I. S. BEACH     2,689,518
WIENER ROASTER OR THE LIKE
Filed June 25, 1951
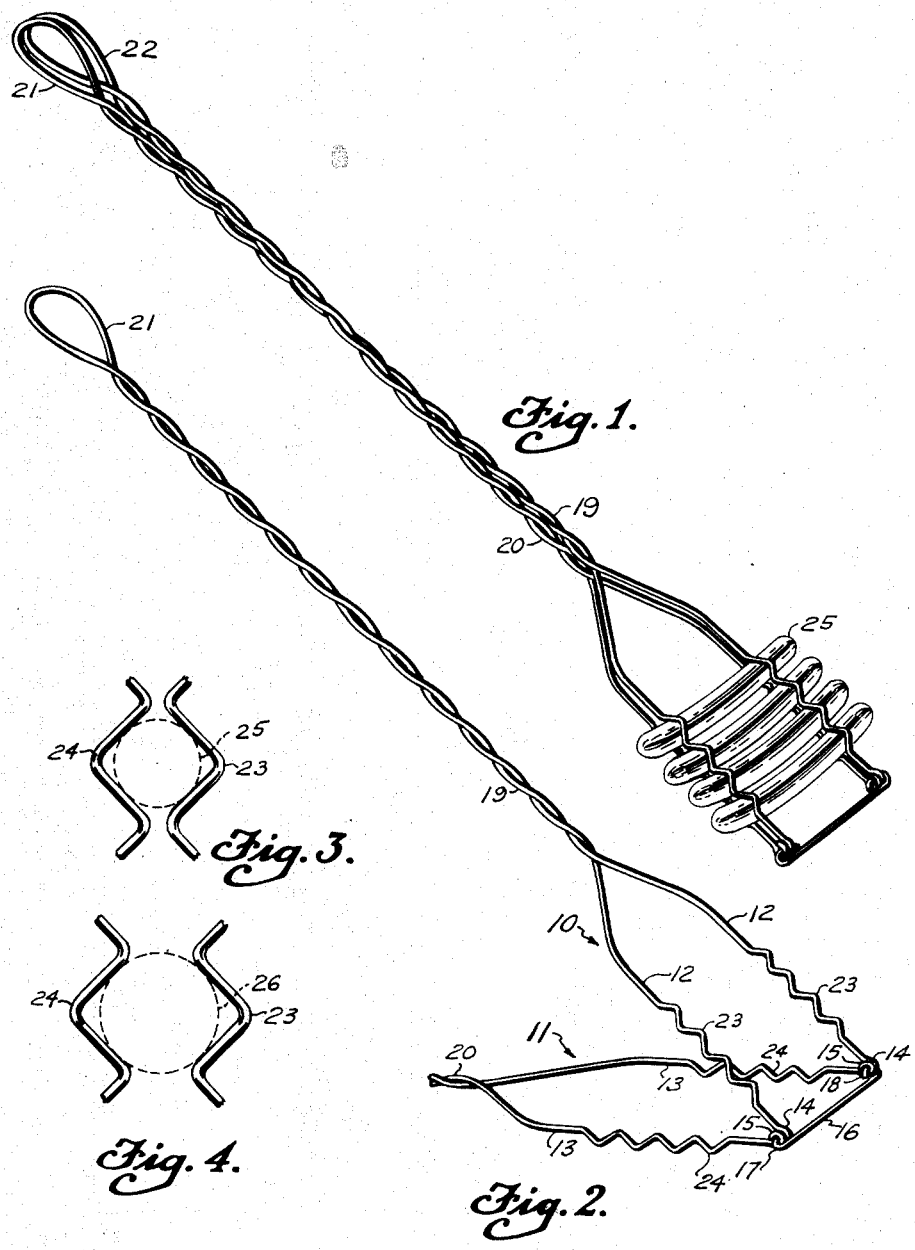
I. S. BEACH
*INVENTOR*
BY *Herbert J. Brown*
*ATTORNEY*

Patented Sept. 21, 1954

2,689,518

UNITED STATES PATENT OFFICE 2,689,518

WIENER ROASTER OR THE LIKE

Irl S. Beach, Cleburne, Tex.

Application June 25, 1951, Serial No. 233,337

1 Claim. (Cl. 99—441)

This invention relates to roasters or broilers for cooking food over an open fire, and is particularly designed for cooking wieners and the like.

An object of the invention is to provide an economical construction made entirely of wire for the described purpose, and in which welding and special fittings are eliminated.

Another object of the invention is to provide a roaster or broiler for wieners or the like which may be made of inexpensive and relatively soft wire, yet one which is capable of supporting a multiple of wieners or the like.

A further object of the invention is to provide a wiener roaster or broiler capable of holding a multiple of wieners of various diameters.

The invention will be more readily understood by reference to the accompanying drawing and the following description.

Figure 1 is a perspective view of a wiener roaster or the like embodying the features of the invention and showing the same holding a multiple of wieners in the frame portion thereof.

Figure 2 is a broken perspective view, similar to Figure 1, showing the frame in its open position with the wieners removed.

Figures 3 and 4 are broken side elevations of the frame and showing the construction whereby wieners of different diameters may be held therebetween.

A roaster or broiler in accordance with my invention is made entirely of wire and includes identical frames 10 and 11 each having spaced parallel sides 12 and 13, respectively. The ends of the frame sides 12 and 13 are formed into eyes 14 and 15 and arranged whereby the eyes of the respective frames 10 and 11 are positioned in side by side relation and concentric with a common axis. A hinge arrangement is carried out by means of a transverse member 16 positioned through the pairs of eyes 14 and 15, and the ends of which member are inwardly bent, as at 17 and 18, for hingedly holding the two frames 10 and 11 together.

The inner ends of the frames 10 and 11 converge where they are twisted to form separate handle members 19 and 20, and the outer ends of which are formed into relatively large loops 21 and 22. In order to strengthen the handle members 19 and 20, they are twisted about each other, and the looped ends 21 and 22 provide a latch arrangement for carrying out the described entwined arrangement of the handle members. Both handle members 19 and 20 are of substantially the same length and whereby the looped ends 21 and 22 may be engaged one upon the other when the handle members are twisted about each other.

The side members 12 and 13 are formed into outwardly directed angular reverse bends 23 and 24 perpendicular to planes of the frames 10 and 11, and the angles of which bends are substantially ninety degrees so as to accommodate wieners 25 or 26 of different diameters, as shown in Figures 3 and 4. The included angles of the bends 23 and 24 of the respective frames 10 and 11 are opposingly arranged for carrying out the last described operation.

The present invention is not limited to the specific construction herein shown and described, but may be made in many ways within the scope of the appended claim.

What is claimed is:

A wiener roaster made entirely of wire stock and comprising a pair of frames each having two spaced parallel side members, eyes formed in the outer ends of said side members and arranged to define a common axis therethrough, a transverse wire member positioned through said eyes and having the outer ends thereof inwardly bent, handle members opposite said eyes and formed by converging and twisting the extending ends of said side members along the entire lengths thereof, said handle members being sufficiently flexible whereby the same may be entwined about each other, relatively large loops formed in the outer ends of the respective members and adapted to engage each other when said handle members are twisted as referred to, and wiener holding means comprised of opposingly arranged reversed bends in said side members, which bends are perpendicularly arranged relative to the respective planes of said frames, and which bends are substantially ninety degrees at the angles thus formed.

References Cited in the file of this patent

UNITED STATES PATENTS

| Number | Name | Date |
| --- | --- | --- |
| 224,761 | Applegate et al. | Feb. 24, 1880 |
| 931,209 | Lincoln et al. | Aug. 17, 1909 |
| 1,945,165 | Smith | Jan. 30, 1934 |
| 1,999,002 | Bennett | Apr. 23, 1935 |
| 2,317,388 | Lako | Apr. 27, 1943 |
| 2,479,533 | Woodbury | Aug. 16, 1949 |
| 2,594,500 | Runnoe | Apr. 29, 1952 |